United States Patent
Bae et al.

(10) Patent No.: US 12,069,650 B2
(45) Date of Patent: Aug. 20, 2024

(54) METHOD AND APPARATUS FOR TIME DOMAIN RESOURCE ALLOCATION (TDRA) OF PHYSICAL DOWNLINK SHARED CHANNEL (PDSCH) IN WIRELESS COMMUNICATION SYSTEM

(71) Applicant: LG ELECTRONICS INC., Seoul (KR)

(72) Inventors: Duckhyun Bae, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 570 days.

(21) Appl. No.: 17/264,728

(22) PCT Filed: Jul. 31, 2019

(86) PCT No.: PCT/KR2019/009566
§ 371 (c)(1),
(2) Date: Jan. 29, 2021

(87) PCT Pub. No.: WO2020/027587
PCT Pub. Date: Feb. 6, 2020

(65) Prior Publication Data
US 2021/0307044 A1   Sep. 30, 2021

(30) Foreign Application Priority Data

Jul. 31, 2018  (KR) .................. 10-2018-0089254

(51) Int. Cl.
*H04W 72/1273* (2023.01)
*H04W 72/0446* (2023.01)
*H04W 72/23* (2023.01)

(52) U.S. Cl.
CPC ... *H04W 72/1273* (2013.01); *H04W 72/0446* (2013.01); *H04W 72/23* (2023.01)

(58) Field of Classification Search
CPC ............ H04W 72/1273; H04W 72/23; H04W 72/0446; H04W 72/042; H04W 76/11;
(Continued)

(56) References Cited

U.S. PATENT DOCUMENTS

2013/0272261 A1   10/2013  Seo et al.
2018/0160418 A1   6/2018   Luo et al.
(Continued)

FOREIGN PATENT DOCUMENTS

KR   1020160128296   11/2016
WO   WO2018062942   4/2018

OTHER PUBLICATIONS

U.S. Appl. No. 62/670,540_Specification_Drawings_May 11, 2018 (Year: 2018).*
(Continued)

*Primary Examiner* — Rushil P. Sampat
(74) *Attorney, Agent, or Firm* — Fish & Richardson P.C.

(57) ABSTRACT

Systems and techniques related to allocating resources for a user equipment (UE) via downlink control information (DCI) in a wireless communication system. Specifically, a UE receives, from a base station, a radio resource control (RRC) message including list information associated with a plurality of time-domain resource allocation (TDRA) tables, and receives, from the base station, a DCI in order to be allocated a resource on a time domain. Here, the resource in the time-domain is allocated according to one TDRA table among the plurality of TDRA tables, based on the DCI and the one TDRA table is selected among the plurality of TDRA tables, based on a configuration of the DCI or a field included in the DCI.

16 Claims, 13 Drawing Sheets

(58) Field of Classification Search
CPC .. H04W 76/27; H04W 80/02; H04L 25/0226; H04L 5/0044; H04L 5/0048; H04L 5/0092; H04L 5/0046; H04L 5/0094
See application file for complete search history.

(56) References Cited

U.S. PATENT DOCUMENTS

| | | | | |
|---|---|---|---|---|
| 2019/0149365 | A1* | 5/2019 | Chatterjee | H04L 25/0226 370/329 |
| 2019/0349941 | A1* | 11/2019 | Yang | H04W 24/08 |
| 2020/0037245 | A1* | 1/2020 | Lu | H04W 72/1273 |
| 2022/0346116 | A1* | 10/2022 | Lin | H04W 56/001 |

OTHER PUBLICATIONS

U.S. Appl. No. 62/620,185_Specification, Jan. 22, 2018 (Year: 2018).*
Ericsson, "Corrections for CSI reporting," R1-1800697, 3GPP TSG RAN WG1 Meeting AH 1801, Vancouver, Canada, dated Jan. 22-26, 2018, 13 pages.
PCT International Search Report in International Appln. No. PCT/KR2019/009566, dated Nov. 29, 2019, 7 pages (with English translation).

* cited by examiner

METHOD AND APPARATUS FOR TIME DOMAIN RESOURCE ALLOCATION (TDRA) OF PHYSICAL DOWNLINK SHARED CHANNEL (PDSCH) IN WIRELESS COMMUNICATION SYSTEM

CROSS-REFERENCE TO RELATED APPLICATIONS

This application is the National Stage filing under 35 U.S.C. 371 of International Application No. PCT/KR2019/009566, filed on Jul. 31, 2019, which claims the benefit of KR application No. 10-2018-0089254, filed on Jul. 31, 2018, the contents of which are all hereby incorporated by reference herein in their entirety.

TECHNICAL FIELD

The present disclosure relates to a method for transmitting and receiving data in a wireless communication system. More particularly, the present disclosure relates to a method for allocating resources to user equipments in a wireless communication system in a dynamic or semi-static manner, and a device for supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Purpose

The present disclosure proposes a method for allocating resources dynamically or semi-statically to a user equipment in a wireless communication system.

Further, the present disclosure proposes a method for delivering additional information related to resource allocation without changing downlink control information (DCI) in a wireless communication system.

Further, the present disclosure proposes a method for increasing the number of bits on a time-domain resource allocation (TDRA) table based on additional information delivered via DCI or a configuration thereof.

Further, the present disclosure proposes a method for defining the TDRA table differently based on the configuration of the DCI or additional information delivered via the DCI.

Further, the present disclosure proposes a method for allocating resources for ULLC (ultra-reliable low-latency communication) or EMBB (enhanced mobile broadband) based on the configuration of DCI or a flag thereof.

The technical purposes to be achieved in the present disclosure are not limited to the technical purposes as mentioned above. Other technical purposes as not mentioned will be clearly understood by those of ordinary skill in the technical field to which the present disclosure belongs from the following description.

Technical Solution

One aspect of the present disclosure provides a method for being allocated a resource, by a user equipment(UE), via downlink control information (DCI) in a wireless communication system, the method comprising: receiving a Radio Resource Control (RRC) message including list information related to a plurality of time-domain resource allocation (TDRA) tables from a base station, and receiving DCI for allocation of a resource on time-domain from the base station, wherein the resource on the time-domain is allocated according to one TDRA table among the plurality of TDRA tables, based on the DCI, wherein one TDRA table is selected among the plurality of TDRA tables, based on a configuration of the DCI and/or a specific field included in the DCI.

In one embodiment of the method, a configuration of the DCI varies based on a service as supported.

In one embodiment of the method, the DCI includes a flag on a type of the resource on the time-domain allocated based on the selected TDRA table.

In one embodiment of the method, wherein the resource on the time-domain allocated based on the selected TDRA table varies based on a value of the flag.

In one embodiment of the method, the selected TDRA table includes at least one of start symbol information related to a symbol at which the allocated time-domain resource starts, interval information on a symbol duration of the allocated time-domain resource, and/or type information on a mapping type in a resource of a demodulation reference signal (DMRS).

In one embodiment of the method, the method further comprising receiving a scheduling message for scheduling the time-domain resource based on the TDRA table, wherein the TDRA table includes an offset value between the scheduling message and the time-domain resource.

In one embodiment of the method, the time-domain resource varies based on RNTI (Radio Network Temporary Identifier) for scheduling the time-domain resource.

In one embodiment of the method, the time-domain resource varies based on MCS (Modulation Coding Scheme) for scheduling the time-domain resource.

In one embodiment of the method, wherein the DCI further includes index information indicating the selected TDRA table.

In one embodiment of the method, the method further comprises receiving a DMRS, wherein a type of the DMRS is used by being fixed to a specific type.

Another aspect of the present disclosure provides a user equipment(UE) for processing resource allocation via downlink control information (DCI) in a wireless communication system, the UE comprising: a radio frequency (RF) module for transmitting and receiving a radio signal; and a processor functionally connected to the RF module, wherein the processor is configured to: control the RF module to: receive a Radio Resource Control (RRC) message including list information related to a plurality of time-domain resource allocation (TDRA) tables from a base station; and receive DCI for allocation of a resource on time-domain from the base station, wherein the resource on the time-domain is allocated according to one TDRA table among the plurality of TDRA tables, based on the DCI, wherein one TDRA table is selected among the plurality of TDRA tables, based on a configuration of the DCI and/or a specific field included in the DCI.

Advantageous Effect

According to the embodiment of the present disclosure, an effect of dynamical or semi-static allocation of resources to the user equipments may be achieved.

Further, according to the embodiment of the present disclosure, an effect of allocating resources for specific services without changing DCI may be achieved.

Further, the present disclosure has an effect of increasing the number of bits of the time-domain resource allocation (TDRA) table based on the additional information delivered via DCI or the configuration thereof.

Further, the present disclosure has the effect of being able to differently define the TDRA table for allocating time-domain resources based on additional information delivered via DCI or the configuration of DCI, according to URLLC or EMBB.

Further, according to the embodiment of the present disclosure, the resources may be allocated without increasing the size of the DCI, such that the flexibility of sufficient resource allocation required for high SCS and wide bandwidth may be secured while minimizing system changes.

The effects that may be obtained from the present disclosure are not limited to the effects mentioned above. Other effects not mentioned may be clearly understood by those of ordinary skill in the technical field to which the present disclosure belongs from the following description.

BRIEF DESCRIPTION OF THE DRAWINGS

The accompanying drawings, which are included as part of the detailed description to help understand the present disclosure, provide embodiments of the present disclosure, and describe technical features of the present disclosure together with the detailed description

MODE FOR DISCLOSURE

Figure 1:
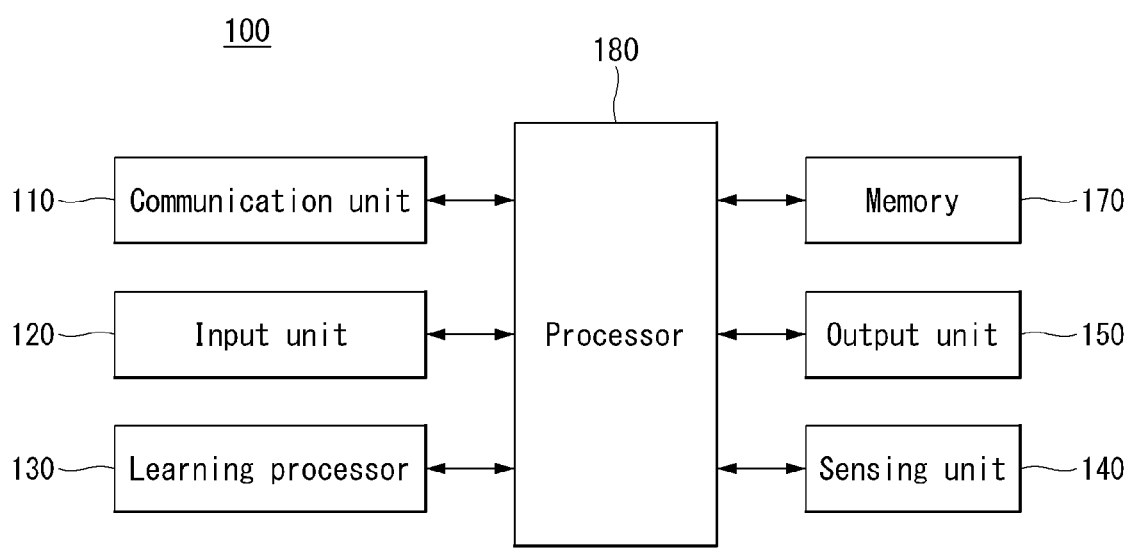
FIG. 1 is a diagram showing an AI device to which the method proposed in the present disclosure can be applied.

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciates that the present disclosure may be practiced without these specific details.

In some cases, in order to avoid obscuring the concept of the present disclosure, well-known structures and devices may be omitted, or may be illustrated in a block diagram form centering on core capabilities of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service(GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA(Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (5G NR) defines enhanced mobile broadband (eMBB), massive machine type communications (mMTC), Ultra-Reliable and Low Latency Communications (URLLC), vehicle-to-everything (V2X) according to a usage scenario.

In addition, the 5G NR standard is classified into standalone (SA) and non-standalone (NSA) according to co-existence between the NR system and the LTE system.

In addition, the 5G NR supports various subcarrier spacings, and supports CP-OFDM in downlink and CP-OFDM and DFT-s-OFDM (SC-OFDM) in uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, "A and/or B" may be interpreted as the same meaning as "including at least one of A or B".

Hereinafter, an example of 5G usage scenarios to which the method proposed in the present disclosure may be applied will be described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
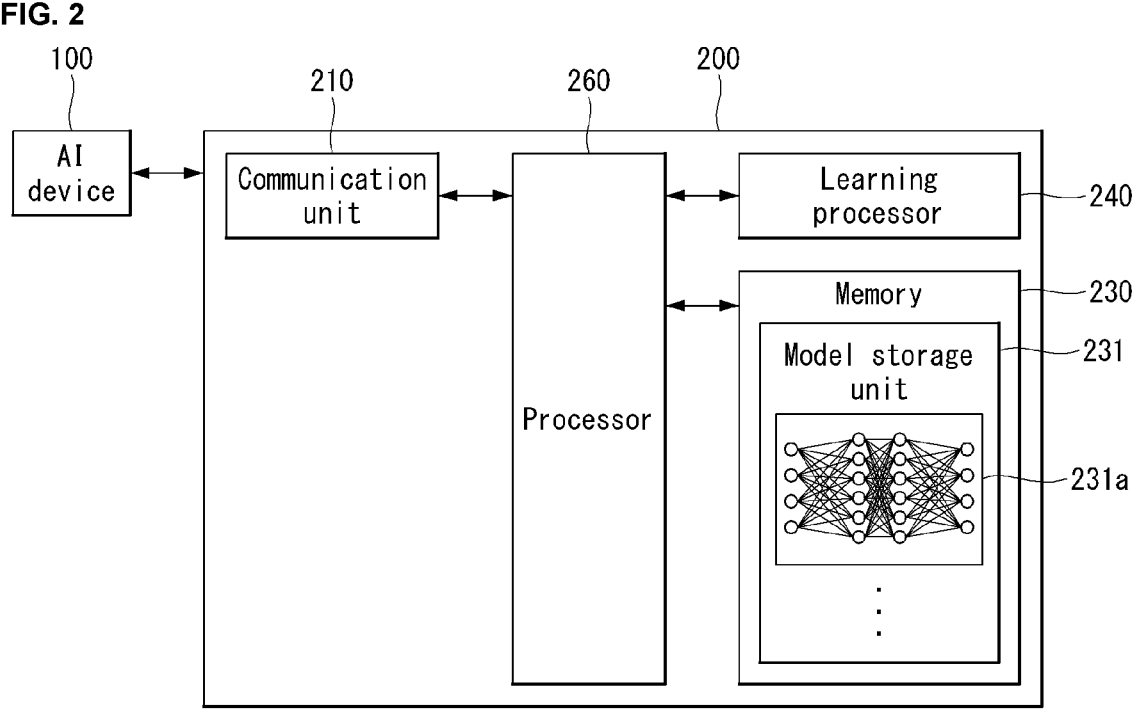
FIG. 2 is a diagram showing an AI server to which the method proposed in the present disclosure can be applied.

FIG. 2 illustrates an AI server 200 according to an embodiment of the disclosure.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
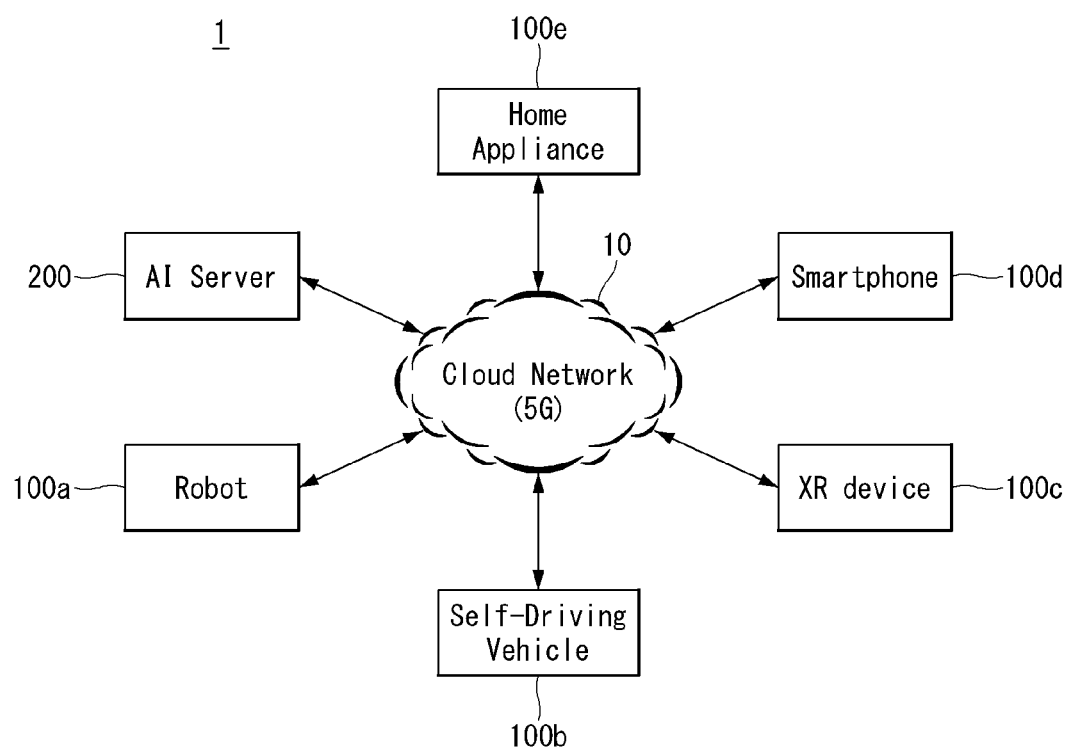
FIG. 3 is a diagram showing an AI system to which the method proposed in the present disclosure can be applied.

FIG. 3 illustrates an AI system 1 according to an embodiment of the disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Seif-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: An eLTE eNB is an evolution of an eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: It corresponds to one subcarrier spacing in the frequency domain. By scaling the reference subcarrier spacing to an integer N, different numerology can be defined.

NR: NR Radio Access or New Radio

System General

Figure 4:
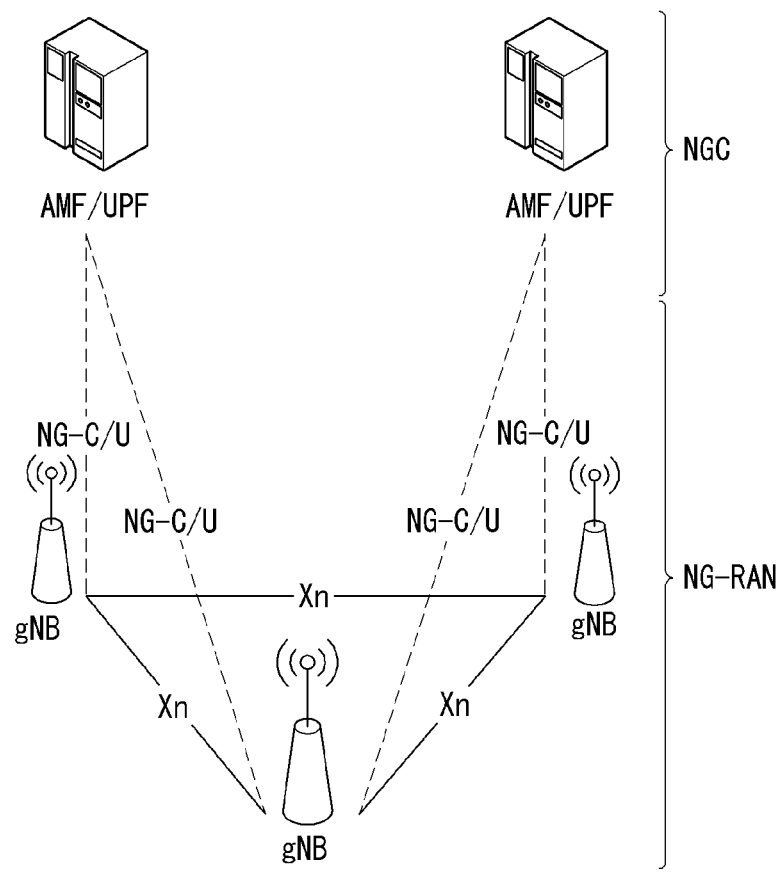
FIG. 4 illustrates an example of an overall structure of a NR system to which a method proposed by the present disclosure is applicable.

FIG. 4 illustrates an example of an overall structure of a new radio (NR) system to which a method proposed by the present disclosure is applicable.

Referring to FIG. 4, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$, where $\Delta f_{max} = 480\text{-}103$ and $N_f = 4096$ Downlink and uplink transmissions are organized into radio frames with a duration of $(\Delta f_{max} N_f/100) \cdot T_s = 10$ ms. The radio frame consists of ten subframes each having a section of $T_{sf} = (\Delta f_{max} N_f/1000) \cdot T_s = 1$ ms. In this case, there may be a set of frames in the uplink and a set of frames in the downlink.

Figure 5:
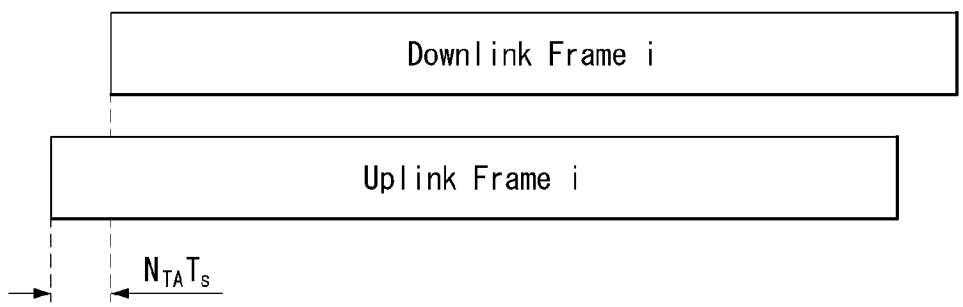
FIG. 5 illustrates a relation between an uplink frame and a downlink frame in a wireless communication system to which a method proposed by the present disclosure is applicable.

FIG. 5 illustrates a relation between a UL frame and a DL frame in a wireless communication system to which a method proposed by the disclosure is applicable.

As illustrated in FIG. 5, a UL frame number i for transmission from a user equipment (UE) shall start $T_{TA} = N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, N_{subframe}^{slots,\mu}-1\}$ within a radio frame. One slot consists of consecutive OFDM symbols of $N_{symb}^\mu$, and $N_{symb}^\mu$ is determined depending on a numerology in use and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| µ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 6:
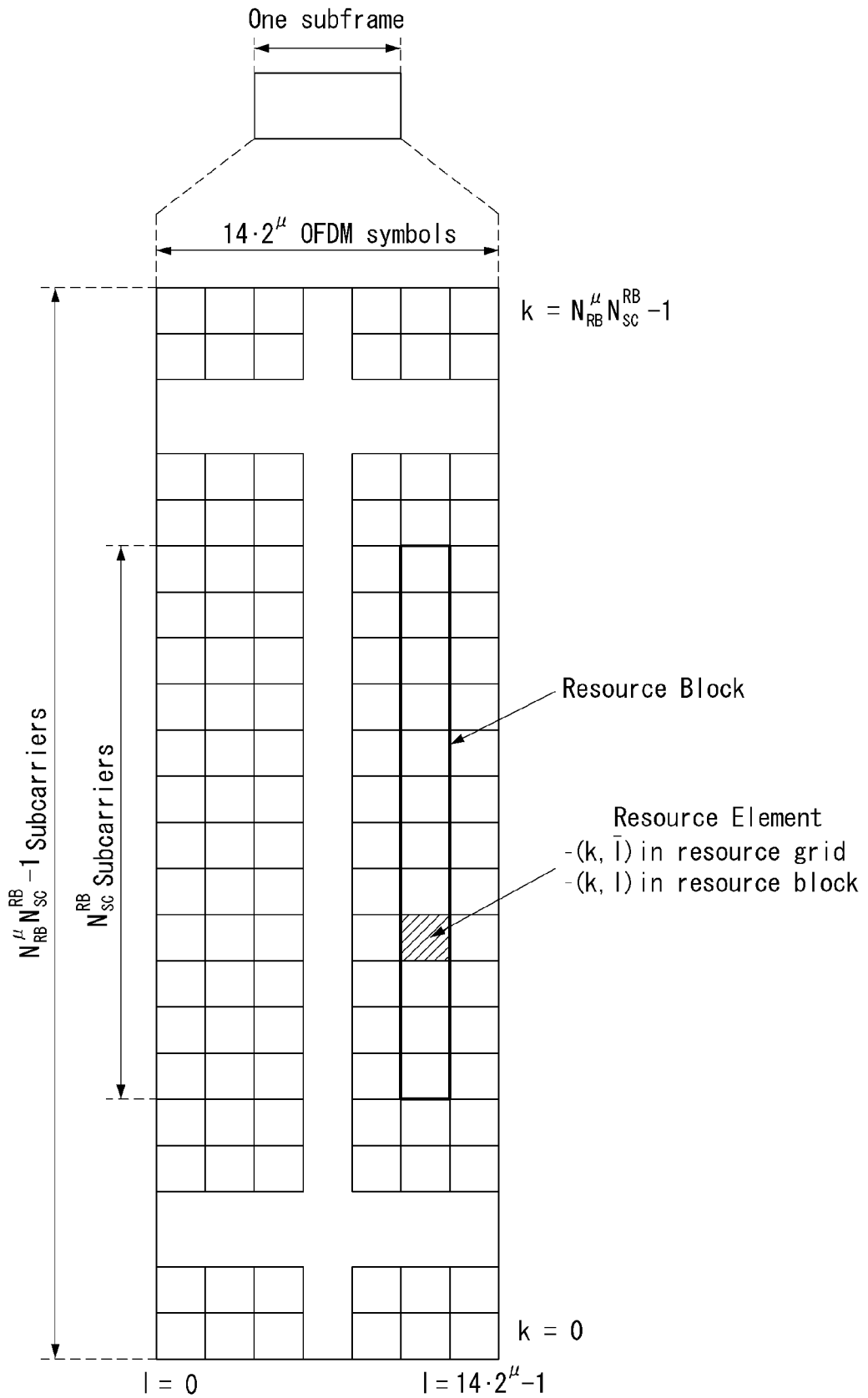
FIG. 6 illustrates an example of a resource grid supported in a wireless communication system to which a method proposed by the present disclosure is applicable.

FIG. 6 illustrates an example of a resource grid supported in a wireless communication system to which a method proposed by the disclosure may be applied.

Referring to FIG. 6, a resource grid is composed of $N_{RB}^{\mu} N_{sc}^{RB}$ subcarriers in a frequency domain, each subframe composed of 14·2µ OFDM symbols, but the disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 7:
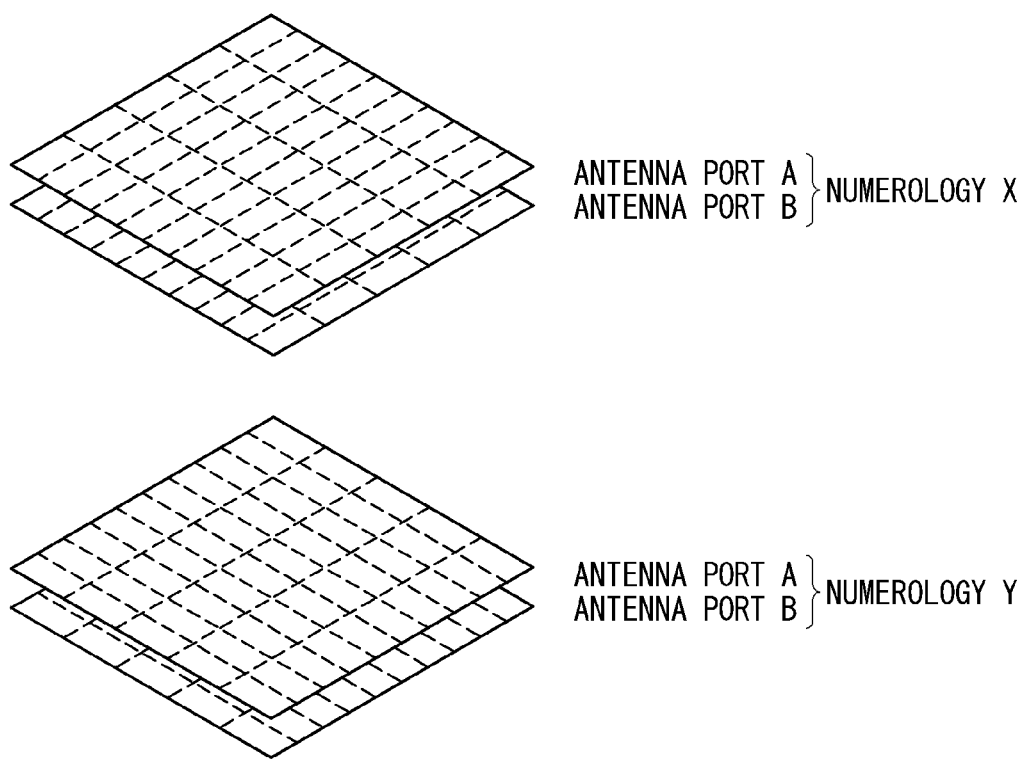
FIG. 7 shows examples of a resource grid for each antenna port and each neurology to which a method proposed according to the present disclosure may be applied.

In this case, shown as FIG. 7, one resource grid may be configured for the numerology µ and an antenna port p.

FIG. 7 shows examples of an antenna port and a resource grid for each neurology to which the method proposed in the present disclosure may be applied.

Each element of the resource grid for the numerology µ and the antenna port p is indicated as a resource element, and may be uniquely identified by an index pair (k,l̄) Herein, k=0, . . . , $N_{RB}^{\mu} N_{sc}^{RB}-1$ is an index in the frequency domain, and l̄=0, . . . $2^{\mu} N_{symb}^{(\mu)}-1$ indicates a location of a symbol in a subframe. To indicate a resource element in a slot, the index pair (k,l̄) is used. Herein, l=0, . . . , $N_{symb}^{\mu}-1$.

The resource element (k,l̄) for the numerology µ and the antenna port p corresponds to a complex value $a_{k,l̄}^{(p,\mu)}$. When there is no risk of confusion or when a specific antenna port or numerology is specified, the indexes p and µ may be dropped and thereby the complex value may become $a_{k,l̄}^{(p)}$ or $a_{k,l̄}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB\mu}-1$ in the frequency region.

Self-Contained Slot Structure

Figure 8:
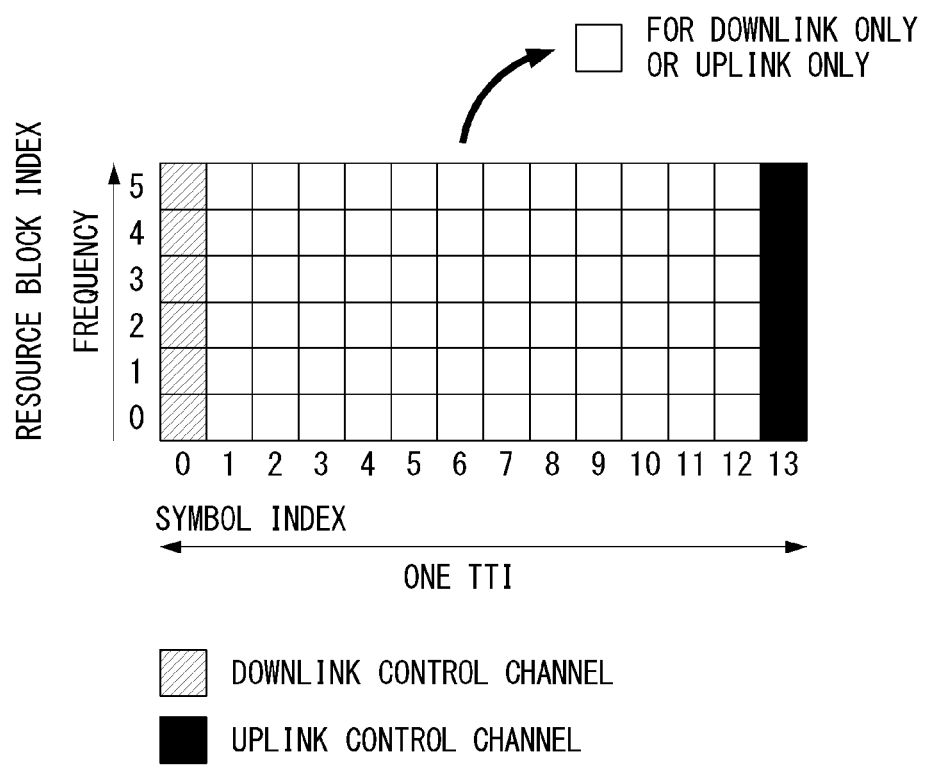
FIG. 8 is a diagram showing an example of a self-contained slot structure to which a method proposed according to the present disclosure may be applied.

In order to minimize the latency of data transmission in the TDD system, the 5th generation New RAT (NR) considers the self-contained slot structure as shown in FIG. 8.

That is, FIG. 8 is a diagram showing an example of a self-contained slot structure to which the method proposed according to the present disclosure may be applied.

In FIG. 8, a shaded region 810 represents a downlink control region, and a black region 820 represents an uplink control region.

A blank region 830 may be used for downlink data transmission, or may be used for uplink data transmission.

The feature of this structure is that DL transmission and UL transmission are sequentially performed within one slot, and DL data is transmitted and UL Ack/Nack is transmitted and received within one slot.

Such a slot may be defined as a 'self-contained slot'.

That is, using this slot structure, the base station may reduce a time consumed to retransmit data to the user equipment when a data transmission error occurs, and thus may minimize the latency of the final data transfer.

This self-contained slot structure requires a time gap for which the base station and the user equipment switch from a transmission mode to a reception mode or switch from a reception mode to a transmission mode.

To this end, in the corresponding slot structure, some OFDM symbols at the time of switching from DL to UL are set as a guard period (GP).

Analog Beamforming

In the millimeter wave (mmW), a wavelength is shortened, so a plurality of antennas can be installed in the same area. That is, in the 30 GHz band, a wavelength is 1 cm, and a total of 100 antenna elements can be installed on a 5×5(5by5) cm panel in a 2-dimensional array with 0.5 lambda (i.e., wavelength) intervals. Therefore, in the mmW, the plurality of antenna elements are used to increase a beamforming (BF) gain, thereby increasing coverage or throughput.

In this case, by providing a transceiver unit (TXRU) so that the transmission power and phase can be adjusted for each antenna element, independent beamforming is possible for each frequency resource. However, the installation of the TXRU on all 100 antenna elements causes a problem of ineffectiveness in terms of price. Therefore, a method for mapping a plurality of antenna elements to one TXRU and adjusting a beam direction with an analog phase shifter is considered. This analog BF method has a disadvantage in that it can make only one beam direction in all bands and thus cannot perform frequency selective BF.

It is possible to consider hybrid BF having B TXRUs which is a smaller number than the number of Q antenna elements, which is an intermediate form between digital BF and analog BF. In this case, although there are differences depending on a connection method between the B TXRUs and the Q antenna elements, the direction of beams that can be simultaneously transmitted is limited to B or less.

In the next system, when the user equipment receives scheduling for resource allocation from the base station, the user equipment receives, from the base station, two pieces of information: a time-domain resource allocation (TDRA) table and a frequency-domain allocation (FDRA) table.

The TDRA table contains information on slots and symbols used in scheduling. When there are 14 symbols in one slot, there may be 105 total number of combinations of a start symbol and a length of an allocated symbol (start and length combinations). The size of the information to be included in the TDRA table gradually increases when the allocation of the DMRS mapping type, and the offset between the scheduling message and the scheduled resource that may be given to the user equipment are considered.

To this end, in the next system, a combination of a possible start symbol and a length of an allocated symbol, an offset, and a preset for the DMRS mapping type may be allocated to the user equipment in a semi-static manner.

The semi-static information may reduce signaling overhead, but may limit scheduling for resource allocation of the base station, and may cause a larger signaling overhead in order to change a preset.

In order to solve such a problem, the present disclosure proposes a method for dynamically increasing the flexibility of resource allocation while minimizing RRC (Radio Resource Control) signaling or parameters.

Further, to this end, an additional DCI field or a method for interpreting the DCI field by the user equipment is proposed from the disclosure.

Specifically, according to the present disclosure, when the base station delivers scheduling information via L1 signaling in order to allocate radio resources to the user equipment, an offset for resource allocation or a flag indicating the type of the allocated resource based on the DCI may be obtained via reinterpretation of the additional DCI field or the previous DCI field.

In this connection, when the flag is included in the DCI, the user equipment may interpret differently the TDRA tables based on the flag value. For example, when the value of the flag is '1', the user equipment interprets the TDRA table as a table for resource allocation of URLLC (ultra-reliable low-latency communication). When the flag value is '0', the user equipment may interpret the TDRA table as a table for resource allocation of EMBB (enhanced mobile broadband) or vice versa.

In this case, a DCI configuration (or format) for scheduling the time-domain resource of URLLC or eMBB may be present separately. When the user equipment receives the corresponding DCI, the user equipment may recognize the TDRA table as a TDRA table for time-domain resource allocation of URLLC or eMBB, and may interpret the parameter value.

For example, when a 4-bit DCI format 1_1 for time-domain resource allocation is set for URLLC, and when the user equipment receives the corresponding DCI, the user equipment may recognize the TDRA table as a TDRA table for time-domain resource allocation for URLLC and interpret the parameter value of the table.

That is, resources as allocated may vary according to the TDRA table recognized via DCI.

The base station applies such an offset or flag to the TDRA table, so that the flexibility of the scheduling may be obtained without changing the existing RRC parameter and the L1 indicator process.

Hereinafter, this method will be described in detail.

In the next NR system, a reference time unit assumed or used for transmitting and receiving a physical channel may vary according to an application field or a type of traffic. This reference time unit may be a basic unit for scheduling a specific physical channel. The reference time unit may vary depending on the number of symbols constituting the corresponding scheduling unit and/or the subcarrier spacing.

Hereinafter, in the embodiment of the present disclosure, a description is made based on a slot and a non-slot as a reference time unit for convenience of description. The slot may be, for example, a basic unit of scheduling used for general data traffic (e.g., eMBB).

The non-slot may have a smaller time period than the slot in the time domain, and may be a basic unit of scheduling used in a special purpose traffic or communication scheme (e.g., URLLC, unlicensed band, or millimeter wave).

However, this example is only one of the embodiments. It is obvious that the present disclosure may be extended and applied to a case when the eMBB transmits and receives a physical channel based on the non-slot, or a case when URLLC or other communication techniques transmit and receive physical channels based on the slot.

Hereinafter, the radio resource, the resource, and the resources in the present disclosure may be distinguished from each other based on not only a time and/or frequency resource, but also multiple access schemes such as a spreading code, scrambling code, interleaving pattern, or power allocation.

The embodiment of the present disclosure may be described based on a UL (Uplink) channel/signal or DL (Downlink) channel/signal for convenience of description. However, the disclosure is not limited thereto. The embodiment of the present disclosure may be extended and applied to the transmission method using each DL channel/signal, UL channel/signal, or other wireless communication means.

<Proposal 1: Additional Indicator of DCI for TDRA>

In the next NR system, in order to obtain TDRA information, the user equipment uses the TDRA tables set via RRC and the index of the TDRA table given by DCI to identify a start symbol, a symbol duration, a DMRS mapping type, a K0/K2 offset, etc.

That is, the user equipment may obtain information of TDRA tables for time-domain resource allocation via the RRC message from the base station, and may select one of the TDRA tables transmitted via the RRC message according to the TDRA index value included in the DCI.

The user equipment may recognize the start symbol, symbol duration, DMRS mapping type, K0/K2 offset, etc. for resource allocation via the selected TDRA table.

Therefore, the combination of the start symbol and symbol duration that may be allocated to the user equipment may depend on the size of the TDRA table that the user equipment has.

In this case, the size of the TDRA table may be increased for more dynamic TDRA allocation. However, in fact, considering that the user equipment requires various start symbols and symbol durations but does not require various K2 and/or K0 at the same time, increasing the entry of the TDRA table will greatly increase the overhead.

For example, in order to change some of the entries, it may be necessary to re-configure the entire table via RRC signaling.

Hereinafter, a method in which the user equipment differently interprets the set value of the TDRA table via additional dynamic signaling, without changing the TDRA table will be described.

That is, the user equipment interprets the value of the received TDRA table differently in various ways, so that various resources may be allocated to the user equipment under the same TDRA table value.

First, for TDRA in the legacy DCI, additional information may be transmitted to the user equipment via following options.

Option 1: In order to transmit additional information via the DCI, a specific field may be added to the DCI configuration, or a new DCI configuration (or, format) may be set.

That is, a field for transmitting additional information is added to the DCI, such that the user equipment may interpret the TDRA table based on the added field or may interpret the TDRA table based on the newly defined DCI format.

For example, when a field is added to DCI, the user equipment may recognize whether the TDRA table is a table for URLLC or a table for eMBB, based on the added DCI field.

Alternatively, when the format of DCI is added, and when a DCI of a specific format is received by the user equipment, the user equipment may interpret the TDRA table as a table for URLLC or a table for eMBB based on the format of DCI. In this case, the DCI format may be transmitted to the user equipment using a 1 bit value.

That is, the user equipment may recognize the DCI format via a 1 bit value indicating the format of the DCI.

Option 2: Additional information may be delivered via RRC signaling. In this case, an RRC parameter for delivering the additional information may be added.

Option 3: Additional information may be transmitted using an unused value of the existing DCI field.

For example, in the case of resource allocation (RA) using a resource indicator value (RIV) included in DCI, when an unused value (e.g., K bits) not used for RA is used for resource allocation of N RB, a value between $$2^K - \binom{N+1}{2} - 1$$

and $2^K-1$ may be mapped to specific FDRA, and may be used as a 1 bit flag.

In this connection, the newly mapped RIV value may be sequentially mapped to {full BW allocation, first half BW allocation, second half BW allocation, first quarter BW allocation, etc.} applied to the new TDRA interpretation.

In another example, when K bit is used for CSI request, and when the number of set CSI request configurations is smaller than 2^K−1, CSI request bits that are not mapped to the CSI request configuration may be used as a space that may contain additional information. This scheme may be useful when allocating a small sized (PUSCH) resource that may not be transmitted along with UCI.

Option 4: TDRA interpretation may be applied differently according to the Radio Network Temporary Identifier (RNTI) used for resource allocation scheduling of the base station. That is, TDRA interpretation may be applied differently according to the RNTI used for dynamic Modulation Coding Scheme (MCS) table change or the RNTI used for semi persistence scheduling (SPS)/configured grant transmission.

Alternatively, a separate RNTI may be allocated for TDRA interpretation.

That is, the usage of the TDRA may be determined differently according to the RNTI used for scheduling. For example, the same TDRA may be used as resource allocation information for URLLC or resource allocation information for eMBB, according to the RNTI used for scheduling.

Option 5: TDRA may be interpreted differently according to the MCS table used for scheduling. Different MCS tables may imply that the characteristics of TB (Transport Block) as used are different from each other. This means that the size of an alternative resource to be used for each TB may vary. Therefore, the RA may be interpreted in a different manner according to the MCS table.

That is, TDRA may be interpreted as resource allocation information for a specific service, based on the MCS table used for scheduling.

For example, TDRA may be used as resource allocation information for URLLC or resource allocation information for eMBB, based on the MCS table used for scheduling.

Option 6: TDRA may be interpreted differently according to the subcarrier spacing set in the BWP used by the user equipment. Considering the larger number of cases of TDRA in the lower SCS, the TDRA that may have more flexible start symbol and symbol duration may be interpreted and used in the lower SCS, while in higher SCS, the interpretation of the legacy TDRA may be used.

Alternatively, on the contrary, when higher SCS is used, the user equipment may use a wide bandwidth, such that the flexibility of the TDRA may be secured while limiting the flexibility of the FDRA to some extent.

Option 7: Resource allocation information of TDRA may be used differently according to the search space or CORESET in which the user equipment receives the scheduling DCI. For example, the interpretation of TDRA may be applied differently depending on the location of the start symbol of CORESET/SS, or the interpretation method of TDRA may be explicitly set when setting CORESET/SS.

Option 8: What service for which resource allocation information is related to TDRA may be determined, based on the CCE aggregation level or the specific CCE index as used when the user equipment receives the scheduling DCI.

For example, TDRA may be interpreted as resource allocation information for URLLC or resource allocation information for eMBB, according to the CCE aggregation level or the specific CCE index as used.

Option 9: The TDRA table may be interpreted in a different manner according to the entry indicated by the TDRA field. Specifically, when the TDRA field indicates a value of a pre-configured(preset) range or a range set via higher layer signaling, the user equipment may interpret TDRA differently, based on the value.

Alternatively, a specific column of the TDRA table may set the flag indicating how to interpret the TDRA table. The corresponding flag may mean whether to apply a value of the SLIV (Start and Length Indicator Value) of the corresponding TDRA from the first OFDM symbol in the slot or from the last symbol (or start symbol) of PDCCH/DCI. In this case, SLIV interpretation for TDRA may vary according to flags.

<Proposal 2: Different Interpretations of TDRA Using Additional Indicator>

As described in Proposal 1, when the user equipment receives an additional indicator, the user equipment may interpret the TDRA table obtained via RRC signaling differently according to the value of the received indicator.

In this connection, the user equipment may use additional information as below or interpret the TDRA table differently.

Embodiment 1

Information (or indicator) additionally received via DCI may be used as an offset of SLIV of TDRA. This approach may be effective when the number of additional bits is large as in Option 1.

In this connection, the offset value may be applied as follows.

Embodiment 1-1: The offset value may be applied to the SLIV value. That is, the offset value may be used as the SLIV value. Depending on the current SLIV value, the location of the start symbol may be changed, or the start symbol and symbol duration may be changed together.

Embodiment 1-2: The offset value may be an offset for the start symbol of SLIV. This makes it possible to allocate various frequency resources when the size of the TDRA table is small.

When the interpreted start symbol is S, the symbol duration is L, and the set offset is K, a value calculated via (1) or (2) of a following mathematical formula 2 may be the value of the new start symbol.

[Equation 2]

$$S+K \bmod(14-L+1) \quad (1)$$

$$S+s*K \bmod(14-L+1) \quad (2)$$

In this connection, s in (2) of the mathematical formula 2 is a preset coefficient.

Alternatively, when a set of mainly used start symbols is preset to $\{S\_1, S\_2, S\_3, \ldots, S\_(N-1)\}$, and when S is $S\_n$, $S\_(n+K \bmod N)$ may be used as a new symbol duration.

In this connection, the set of start symbols may vary depending on the given symbol duration L, or some elements (e.g., $S\_n+L>14$) may be removed.

Embodiment 1-2: The offset value may be used as an offset value for the symbol duration of the interpreted SLIV. When the interpreted symbol duration is L and the given offset value is K, a value calculated via (1) or (2) of a following mathematical formula 3 may be used as a symbol duration.

[Equation 3]

$$L+K \quad (1)$$

$$L+I*K \quad (2)$$

In (2) of mathematical formula 3, I may be a preset coefficient.

Alternatively, a set of mainly used symbol durations may be preset to $\{L\_1, L2, L\_3, \ldots, L\_(N-1)\}$. In this case, when L is $L\_n$, $L\_(n+K \bmod N)$ may be used as a new symbol duration. This approach may be effective when a usable symbol duration is predetermined as in PDSCH mapping type B.

Embodiment 2

Information (or indicator) additionally transmitted via DCI may be used as a flag that may be used to interpret TDRA differently. This approach may be effective when additional information is small, such as 1 bit. TDRA may be interpreted via a following scheme.

Figure 9:
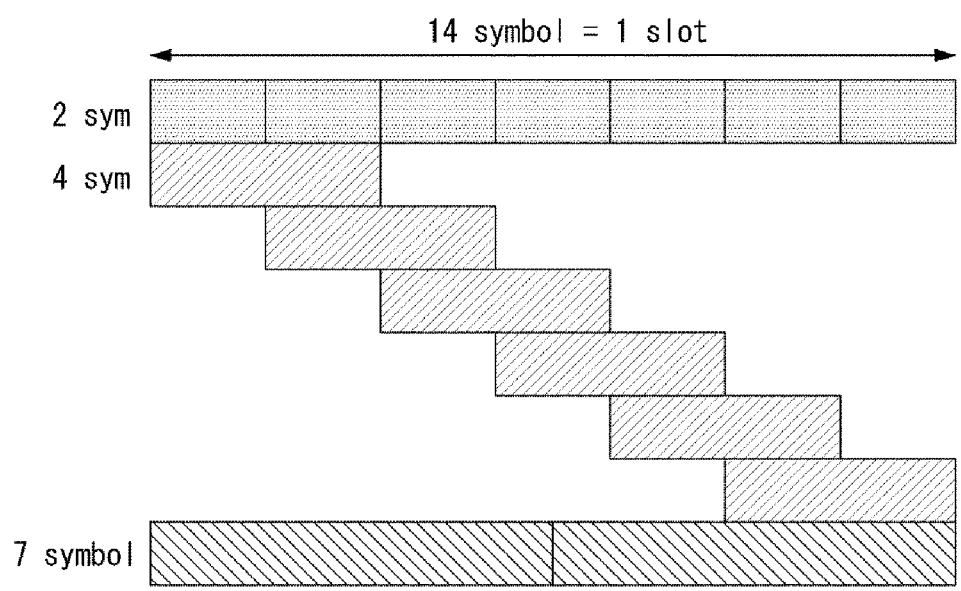
FIG. 9 is a diagram showing an example of a method for allocating a resource in consideration of a TDRA field proposed according to the present disclosure.

FIG. 9 is a diagram showing an example of a method for allocating a resource in consideration of a TDRA field proposed according to the present disclosure.

Embodiment 2-1: The TDRA field of DCI may be used as a SLIV value. Considering that a maximum size of the TDRA field is 4 bits, 16 SLIV values may be expressed as a TDRA field. Thus, one of preset combinations of a start symbol and a symbol duration may be selected.

For example, 16 values may be used to represent one of the values of 2, 4, and 7 symbols shown in FIG. 9. To this end, the length of the TDRA bit field may be extended.

For example, SLIV may be interpreted using 6-bit TDR to indicate all possible cases of 1-4 and 12-14 symbol durations and combinations of some start symbols and symbol duration lengths of 5 symbol durations.

Alternatively, 5 bits may be used to indicate SLIV to support combinations of all possible start symbols and symbol duration lengths of 2, 4, and 7 symbol durations. This approach may be effective when the symbol duration is limited to 2, 4, and 7 as in PDSCH mapping type B.

In this case, the DMRS mapping type, K0 and K2 offsets may be fixed to specific values.

For example, when using 5 bits to indicate the SLIV, and combinations of the start symbol and symbol duration length, the mapping type of DMRS may be fixed to mapping type B.

Alternatively, the symbol duration may be compared with a specific value and the mapping type of DMRS may be fixed to a specific mapping type, based on the comparison result. For example, when the symbol duration is smaller than a specific value, the mapping type of DMRS may be fixed to mapping type B. When the symbol duration is greater than the specific value, the mapping type of DMRS may be fixed to mapping type A.

Further, K0/K2 may be fixed to a specific value n such as 0, 1, or 4, or may be determined with referring to the value of the minimum, maximum, or specific index of the TDRA table entry previously used by the user equipment.

Alternatively, the symbol duration may be compared with a specific value, and the value of K0/K2 may be determined, based on the comparison result. For example, when the symbol duration is smaller than a specific value, the value of K0/K2 may be determined as n (e.g., 0 or 1). When the symbol duration is greater than the specific value, the value of K0/K2 may be determined as m (e.g., 4).

In this connection, the values of n and m may be preset or may be values obtained via L1 signaling or higher layer signaling.

Alternatively, DMRS mapping type, K0 and K2 offset may not be fixed to specific values, but may be indicated using some of the TDRA field bits or by extending the TDRA field.

For example, a value of a specific bit position may indicate a DMRS mapping type, and the bit value at the specific position may mean an offset value of K0/K2 and an index of a K0/K2 value set.

That is, the specific bit position of the TDRA field or the extended bit position value thereof may indicate whether the mapping type of the DMRS is A or B. The bit value at the specific position may indicate the offset value of K0/K2 and/or the index of the K0/K2 value set.

In this connection, the K0/K2 value set may be preset, or may be configured based on the K0/K2 values of all or some of the TDRA table entries previously used by the user equipment or may vary according to the symbol duration.

For example, different sets of K0/K2 values may be respectively used in the case where the symbol duration is smaller than the specific value and the case where the symbol duration is larger than the specific value.

Embodiment 3

Information (or indicator) additionally transmitted via DCI may be used as a flag indicating table interpretation schemes or tables itself as indicated by different TDRAs.

Specifically, the base station transmits list information related to a plurality of TDRA tables via RRC signaling and transmits an indicator indicating a scheme for interpreting a plurality of TDRA tables or indicating a specific TDRA table to the user equipment via DCI.

The user equipment may interpret the TDRA based on the indicator received via the DCI, or may select one of the plurality of TDRA tables to recognize an allocated time-domain resource.

For example, the user equipment may recognize the TDRA table as resource allocation information for URLLC or resource allocation information for eMBB via an indicator received via DCI, or may select a TDRA table related to resource allocation information for URLLC or eMBB from among the plurality of TDRA tables via DCI.

Embodiment 3-1: For example, when two or more TDRA tables are used, the user equipment may select a specific TDRA table via a flag transmitted via DCI. In this connection, configurations of two or more TDRA tables may be different from each other.

That is, two or more TDRA tables may have different configurations and thus may include resource allocation information for specific services.

In this case, a DCI configuration (or, format) for scheduling the time-domain resource of URLLC or eMBB may be present separately. Upon receiving the corresponding DCI, the user equipment selects a TDRA table for time-domain resource allocation of URLLC or eMBB from among the plurality of TDRA tables, based on the corresponding DCI and may interpret the parameter value of the selected TDRA table.

For example, a 4-bit DCI format 1_1 for time-domain resource allocation is set for URLLC. In this case, upon receiving the corresponding DCI, the user equipment may select a TDRA table configured for time-domain resource allocation for URLLC from among the plurality of TDRA tables, and recognize the parameter value of the selected TDRA table.

That is, the allocated resource may vary according to the TDRA table selected via DCI.

Specifically, values of columns of the plurality of TDRA tables may have different parameters. For example, in a specific TDRA table, columns may mean a start symbol, symbol duration length, DMRS mapping type, and/or K0/K2 offset, respectively. Columns of another TDRA table may respectively mean a symbol offset from the last symbol of CORESET/PDCCH to the start symbol thereof, a symbol duration length, a DMRS mapping type, and/or a K0/K2 offset.

In other words, the columns of the TDRA table may have different meanings. The user equipment may recognize the type of the TDRA table via the received DCI indicator, and accordingly, may recognize differently parameters represented by the columns of the TDRA table.

Embodiment 3-2: The interpretation scheme for the TDRA table may vary according to the given flag. That is, even in the same TDRA table, parameters that the user equipment may recognize via the corresponding TDRA table may vary according to the value of the flag.

For example, in the TDRA, the location of the start symbol is determined based on the beginning of slot according to the flag. In this case, when the flag indicates "on", the start symbol may be determined based on the PDCCH or CORESET receiving the DCI (e.g., based on the end of the CORESET receiving the DCI).

This scheme may secure the flexibility of resource allocation via a number of CORESET configurations even using a limited TDRA table entry.

That is, for the same TDRA table, the values recognized by the user equipment may vary according to the value of the flag, so that the resource allocation of the base station may be dynamic.

This additional information (or indicator) may be delivered via the following scheme or may be used in combination with specific values.

Embodiment 4-1: A flag for TDRA interpretation may be added to one column of the TDRA table. Depending on the added flag, the start symbol may be interpreted as an offset value from the last symbol of CORESET/PDCCH or an offset value from the start symbol of a slot.

Embodiment 4-2: The value obtained via the additional field of DCI may be used as the offset value of the acquired start symbol.

Embodiment 4-3: When the value indicated by TDRA is included in the specific range, the corresponding value may be mapped to another TDRA table.

Embodiment 4-4: When the value indicated by TDRA is included in the specific range, the start symbol of the TDRA table may be recognized as an offset value from the last symbol of CORESET/PDCCH.

Embodiment 4-5: For CORESET/PDCCH preset or set via higher layer signaling or CORESET/PDCCH that does not start at the beginning of a slot, the start symbol of the TDRA table may be recognized as an offset value from the last symbol of CORESET/PDCCH.

Embodiment 4-6: In the case of scheduling N RB with K bit RB allocation field, given a value between $2^K(N-1/2)-1$ and $2^K-1$, the TDRA field may be interpreted as the SLIV value itself, and predetermined DMRS type, and K0/K2 offset may be used.

Interpretation of the TDRA table via the combination of the transmission scheme and the specific value is not an example of the present disclosure. Various combinations of the methods for transmitting and using the additional information (or, indicator) may be applied.

Figure 10:
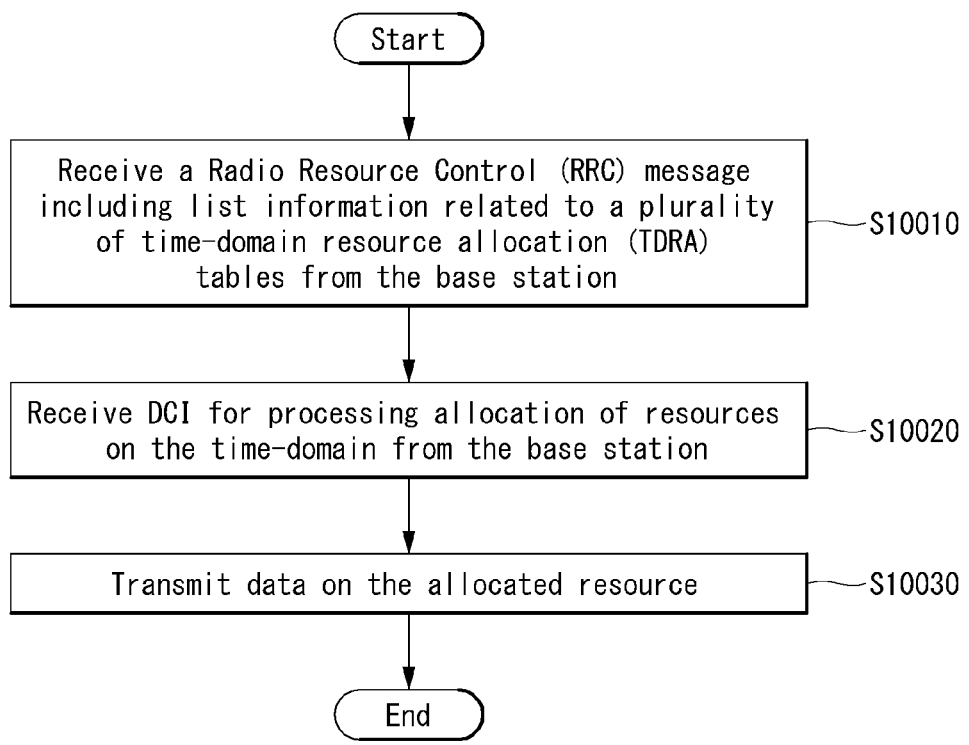
FIG. 10 is a diagram showing an example of a method in which a user equipment proposed according to the present disclosure processes resource allocation according to TDRA, using DCI.

FIG. 10 is a diagram showing an example of a method in which a user equipment proposed according to the present disclosure processes resource allocation according to TDRA, using DCI.

Referring to FIG. 10, the user equipment may differently interpret a TDRA table selected from among a plurality of TDRA tables, based on DCI.

Specifically, the user equipment may receive a Radio Resource Control (RRC) message including list information related to a plurality of time-domain resource allocation (TDRA) tables from the base station (S10010).

Thereafter, the user equipment may receive DCI for processing allocation of resources on the time-domain from the base station (S10020).

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI. For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the user equipment may transmit data to the base station on the allocated resource (S10030).

Figure 12:
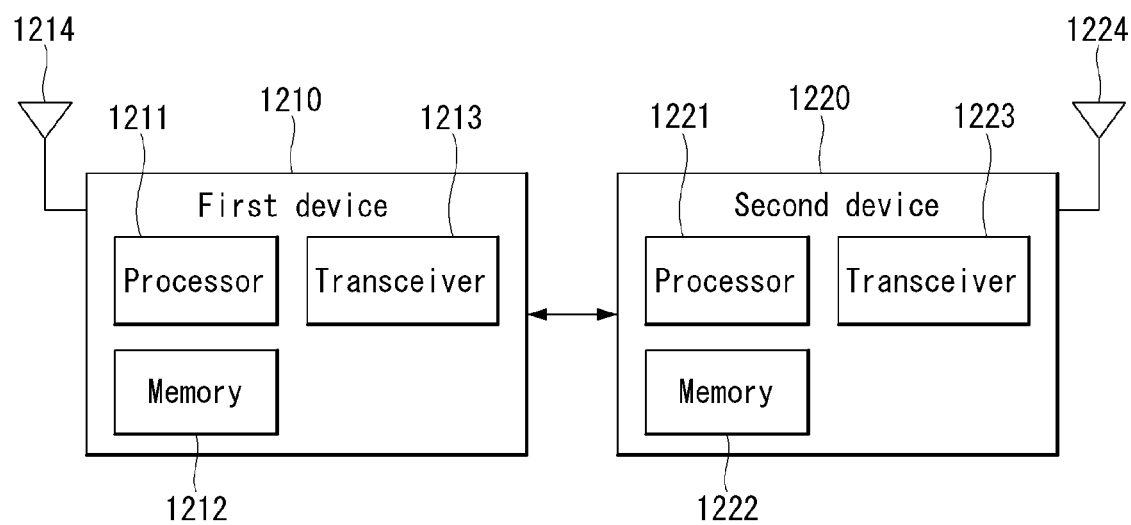
FIG. 12 shows a block diagram of a wireless communication device to which methods proposed according to the present disclosure may be applied.
Figure 13:
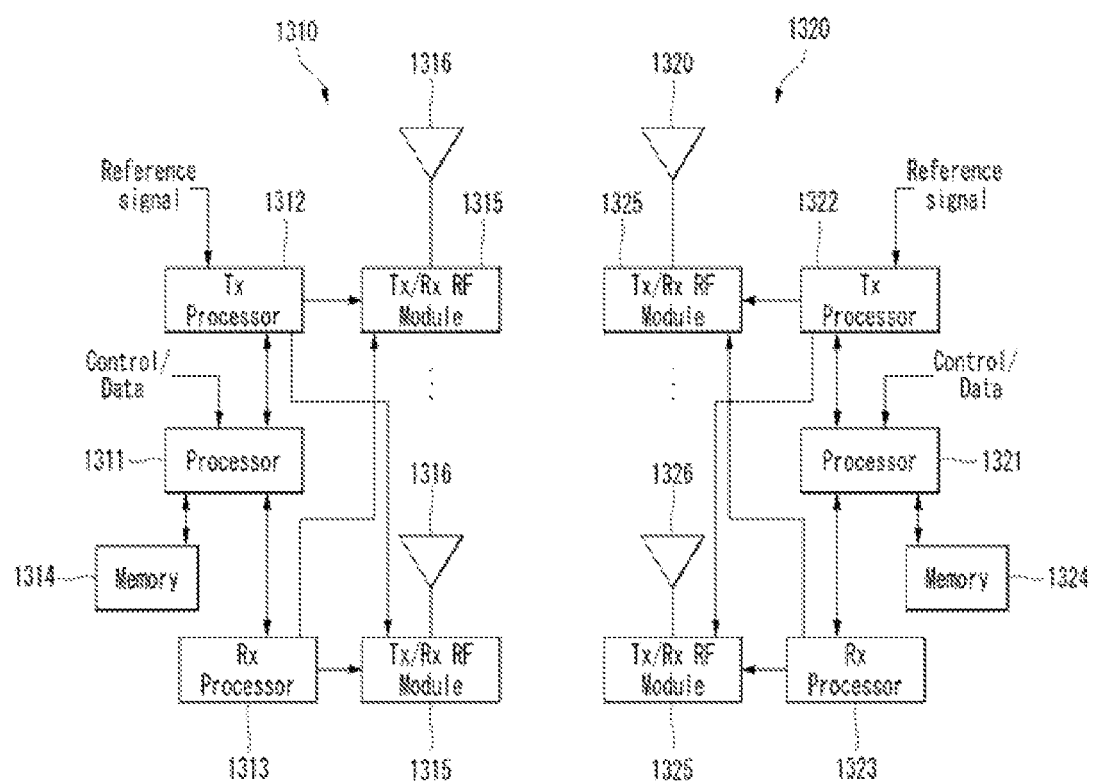
FIG. 13 is another example of a block diagram of a wireless communication device to which the methods proposed according to the present disclosure may be applied.

In this regard, the operation of the user equipment as described above may be specifically implemented by a user equipment 1220 or 1320 shown in FIG. 12 or FIG. 13 of the present disclosure. For example, the operation of the user equipment as described above may be performed by a processor 1221 or 1321 and/or a RF unit (or module) 1223 or 1325.

Specifically, given a value between $2^K(N-1/2)-1$ and $2^K-1$, the TDRA field may be interpreted as the SLIV value itself, and predetermined DMRS type, and K0/K2 offset may be used.

Interpretation of the TDRA table via the combination of the transmission scheme and the specific value is not an example of the present disclosure. Various combinations of the methods for transmitting and using the additional information (or, indicator) may be applied.

FIG. 10 is a diagram showing an example of a method in which a user equipment proposed according to the present disclosure processes resource allocation according to TDRA, using DCI.

Referring to FIG. 10, the user equipment may differently interpret a TDRA table selected from among a plurality of TDRA tables, based on DCI.

Specifically, the user equipment may receive a Radio Resource Control (RRC) message including list information related to a plurality of time-domain resource allocation (TDRA) tables from the base station (S10010).

Thereafter, the user equipment may receive DCI for processing allocation of resources on the time-domain from the base station (S10020).

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI. For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the user equipment may transmit data to the base station on the allocated resource (S10030).

In this regard, the operation of the user equipment as described above may be specifically implemented by a user equipment 1220 or 1320 shown in FIG. 12 or FIG. 13 of the present disclosure. For example, the operation of the user equipment as described above may be performed by a processor 1221 or 1321 and/or a RF unit (or module) 1223 or 1325.

Specifically, the processor 1221 or 1321 may use the RF unit (or module) 1223 or 1325 to receive a Radio Resource Control (RRC) message including list information related to the plurality of time-domain resource allocation (TDRA) tables.

Thereafter, the processor 1221 or 1321 may receive DCI for processing allocation of resources on the time-domain from the base station via the RF unit (or module) 1223 or 1325.

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI.

For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the processor 1221 or 1321 may transmit data to the base station on the allocated resource via the RF unit (or module) 1223 or 1325.

Figure 11:
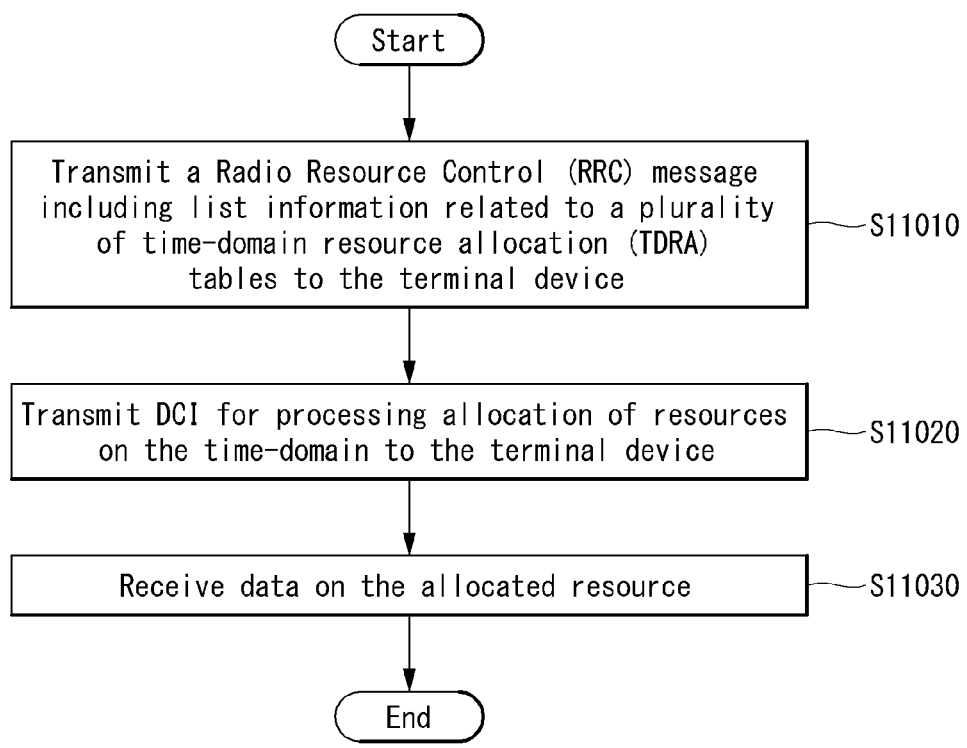
FIG. 11 is a diagram showing an example of a method in which a base station proposed according to the present disclosure allocates resources to a user equipment, according to TDRA, and using DCI.

FIG. 11 is a diagram showing an example of a method in which a base station proposed according to the present disclosure allocates resources to a user equipment according to TDRA and using DCI.

Referring to FIG. 11, the base station may dynamically perform resource allocation using a plurality of TDRA tables via DCI.

Specifically, the base station may transmit a Radio Resource Control (RRC) message including list information related to a plurality of time-domain resource allocation (TDRA) tables to the user equipment (S11010).

Thereafter, the base station may transmit DCI for processing allocation of resources on the time-domain to the user equipment (S11020).

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI. For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the base station may receive data from the user equipment on the allocated resource (S11030).

In this way, the dynamic resource allocation may be realized because the base station may allocate different resources to the user equipment even when the same TDRA table is used.

In this regard, the operation of the user equipment as described above may be specifically implemented by a user equipment 1220 or 1320 shown in FIG. 12 or FIG. 13 of the present disclosure. For example, the operation of the user equipment as described above may be performed by a processor 1221 or 1321 and/or a RF unit (or module) 1223 or 1325.

Specifically, the processor 1221 or 1321 may use the RF unit (or module) 1223 or 1325 to transmit a Radio Resource Control (RRC) message including list information related to the plurality of time-domain resource allocation (TDRA) tables to the user equipment.

Thereafter, the processor 1221 or 1321 may use the RF unit (or module) 1223 or 1325 to transmit DCI for processing allocation of resources on the time-domain to the user equipment.

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI.

For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the processor 1221 or 1321 may receive data from the user equipment on the allocated resource via the RF unit (or module) 1223 or 1325.

Devices to which the present disclosure may be applied

Hereinafter, a device to which the present disclosure may be applied will be described.

FIG. 12 shows a wireless communication device according to an embodiment of the present disclosure.

Referring to FIG. 12, the wireless communication system may include a first device 1210 and a second device 1220.

The first device 1210 may be a base station, a network node, a transmission user equipment, a reception user equipment, a wireless device, a wireless communication device, vehicles, vehicles with autonomous driving functions, connected cars, drones (Unmanned Aerial Vehicles, UAVs), AI (Artificial Intelligence) modules, robots, AR (Augmented Reality) devices, VR (Virtual Reality) devices, MR (Mixed Reality) device, hologram device, a public safety device, an MTC device, an IoT device, a medical device, a fintech device (or a financial device), a security device, a climate/environment device, a device related to 5G service, or a device related to the 4th industrial revolution field.

The second device 1220 may be a base station, a network node, a transmission user equipment, a reception user equipment, a wireless device, a wireless communication device, a vehicle, a vehicle equipped with an autonomous driving function, a connected car, and a drone (Unmanned Aerial Vehicle, UAV), AI (Artificial Intelligence) module, robot, AR (Augmented Reality) device, VR (Virtual Reality) device, MR (Mixed Reality) device, hologram device, a public safety device, an MTC device, an IoT device, a medical device, a fintech device (or a financial device), a security device, a climate/environment device, a device related to 5G service, or a device related to the 4th industrial revolution field.

For example, the user equipment may include mobile phones, smart phones, laptop computers, user equipments for digital broadcasting, personal digital assistants (PDAs), PMP (portable multimedia player), navigation, slate PC, tablet PC, ultrabook, a wearable device (for example, a watch-type user equipment (smartwatch), a glass-type user equipment (smart glass), a head mounted display (HMD)), and the like. For example, the HMD may be a display device worn on the head. For example, HMD may be used to implement VR, AR or MR.

For example, a drone may be a vehicle free of a human being and flying based on a radio control signal. For example, the VR device may include a device that implements an object or a background of a virtual world. For example, the AR device may include a device that connects an object or background of a virtual world to an object or background of the real world and implements the combination. For example, the MR device may include a device that combines an object or a background of a virtual world with an object or a background of the real world and implements the combination. For example, the hologram device may include a device that records and reproduces 3D information using an interference phenomenon of light generated when two laser lights meet, referred to as holography, thereby to implements a 360 degrees 3D image. For example, the public safety device may include an image relay device or an image device wearable on a user's human body. For example, the MTC device and the IoT device may be devices that do not require direct human intervention or manipulation. For example, the MTC device and the IoT device may include a smart meter, a bending machine, a temperature meter, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (in vitro) diagnosis, a device for hearing aid or a procedure. For example, a security device may be a device installed to prevent risks that might arise, and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts the climate/environment.

The first device 1210 may include at least one or more processors, such as the processor 1211, at least one or more memories, such as a memory 1212, and at least one or more transceivers, such as a transceiver 1213. The processor 1211 may perform the above-described functions, procedures, and/or methods. The processor 1211 may perform one or more protocols. For example, the processor 1211 may perform one or more layers of an air interface protocol. The memory 1212 may be connected to the processor 1211. Various types of information and/or commands may be stored therein. The transceiver 1213 may be connected to the processor 1211, and may be controlled to transmit and receive radio signals.

The second device 1220 may include at least one processor, such as the processor 1221, at least one memory device, such as a memory 1222, and at least one transceiver, such as a transceiver 1223. The processor 1221 may perform the above-described functions, procedures, and/or methods. The processor 1221 may implement one or more protocols. For example, the processor 1221 may implement one or more layers of an air interface protocol. The memory 1222 may be connected to the processor 1221. Various types of information and/or commands may be stored therein. The transceiver 1223 may be connected to the processor 1221, and may be controlled to transmit and receive radio signals.

The memory 1212 and/or the memory 1222 may be present inside or outside the processor 1211 and/or the processor 1221, respectively, and may be connected thereto. The memory 1212 and/or the memory 1222 may be connected to other processors using a variety of connection technologies, such as a wired or wireless connection.

The first device 1210 and/or the second device 1220 may have one or more antennas. For example, an antenna 1214 and/or an antenna 1224 may be configured to transmit and receive wireless signals.

FIG. 13 is another example of a block diagram of a wireless communication device to which the methods proposed according to the present disclosure may be applied.

Referring to FIG. 13, the wireless communication system includes a base station 1310 and a plurality of user equipments 1320 located in a base station coverage. The base station may be expressed as a transmitting device, and the user equipment may be expressed as a receiving device, or vice versa. The base station and the user equipment may respectively include processors 1311 and 1321, memories 1314 and 1324, one or more Tx/Rx radio frequency modules 1315 and 1325, Tx processors 1312 and 1322, Rx Processors 1313 and 1323, and antennas 1316 and 1326. The processor implements the above described functions, processes and/or methods. More specifically, in DL (communication from base station to user equipment), higher layer packets from the core network are provided to the processor 1311. The processor implements the functions of the L2 layer. In the DL, the processor provides multiplexing between logical channels and transmission channels, and radio resource allocation to the user equipment 1320, and is responsible for signaling to the user equipment. The transmit (TX) processor 1312 implements various signal processing functions for the L1 layer (that is, the physical layer). The signal processing function facilitates forward error correction (FEC) in the user equipment, and includes coding and interleaving. The encoded and modulated symbols are divided into parallel streams. Each stream is mapped to an OFDM subcarrier and in turn is multiplexed with a reference signal (RS) in the time and/or frequency domain, and then the streams are combined together using IFFT (Inverse Fast Fourier Transform) to create a physical channel carrying a time-domain OFDMA symbol stream. The OFDM stream is spatially precoded to produce multiple spatial streams. The spatial streams may be provided to different antennas 1316 via a separate Tx/Rx module (or transceiver 1315). Each Tx/Rx module may modulate an RF carrier into each spatial stream for transmission. In the user equipment, each Tx/Rx module (or transceiver 1325) receives a signal via each antenna 1326 of each Tx/Rx module. Each Tx/Rx module reconstructs information modulated into an RF carrier and provides the information to the reception (RX) processor 1323. The RX processor implements a variety of layer 1 signal processing functions. The RX processor may perform spatial processing on the information to reconstruct an arbitrary spatial stream destined for the user equipment. When multiple spatial streams are directed to the user equipment, they may be combined into a single OFDMA symbol stream by multiple RX processors. The RX processor converts the OFDMA symbol stream from the time-domain to the frequency domain using Fast Fourier Transform (FFT). The frequency domain signal includes a separate OFDMA symbol stream for each subcarrier of the OFDM signal. The symbols and reference signal on each subcarrier are reconstructed and demodulated by determining the most probable signal constellation points transmitted by the base station. These soft decisions may be based on channel estimate values. Soft decisions are decoded and deinterleaved to restore the data and control signals originally transmitted by the base station on the physical channel. Corresponding data and control signals are provided to the processor 1321.

The UL (communication from user equipment to base station) is processed in the base station 1310 in a manner similar to that as described in connection with the receiver function in the user equipment 1320. Each Tx/Rx module 1325 receives a signal via a respective antenna 1326. Each Tx/Rx module provides an RF carrier and information to the RX processor 1323. The processor 1321 may be associated with a memory 1324 that stores program codes and data therein. The memory may be referred to as a computer-readable medium.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

may receive, through, a Radio Resource Control (RRC) message including list information related to the plurality of time-domain resource allocation (TDRA) tables.

Thereafter, the processor 1221 or 1321 may receive DCI for processing allocation of resources on the time-domain from the base station via the RF unit (or module) 1223 or 1325.

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI.

For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the processor 1221 or 1321 may transmit data to the base station on the allocated resource via the RF unit (or module) 1223 or 1325.

FIG. 11 is a diagram showing an example of a method in which a base station proposed according to the present disclosure allocates resources to a user equipment according to TDRA and using DCI.

Referring to FIG. 11, the base station may dynamically perform resource allocation using a plurality of TDRA tables via DCI.

Specifically, the base station may transmit a Radio Resource Control (RRC) message including list information related to a plurality of time-domain resource allocation (TDRA) tables to the user equipment (S11010).

Thereafter, the base station may transmit DCI for processing allocation of resources on the time-domain to the user equipment (S11020).

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI.

For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the base station may receive data from the user equipment on the allocated resource (S11030).

In this way, the dynamic resource allocation may be realized because the base station may allocate different resources to the user equipment even when the same TDRA table is used.

In this regard, the operation of the user equipment as described above may be specifically implemented by a user equipment 1220 or 1320 shown in FIG. 12 or FIG. 13 of the present disclosure. For example, the operation of the user equipment as described above may be performed by a processor 1221 or 1321 and/or a RF unit (or module) 1223 or 1325.

Specifically, the processor 1221 or 1321 may use the RF unit (or module) 1223 or 1325 to transmit a Radio Resource Control (RRC) message including list information related to the plurality of time-domain resource allocation (TDRA) tables to the user equipment.

Thereafter, the processor 1221 or 1321 may use the RF unit (or module) 1223 or 1325 to transmit DCI for processing allocation of resources on the time-domain to the user equipment.

In this connection, DCI may include additional information (or indicator) for interpreting and/or selecting the TDRA table as described in Proposal 1 and 2 above.

Depending on the DCI format, parameter values related to resource allocation that the user equipment may recognize via the TDRA table may vary. For example, parameters implied by columns of the TDRA table vary according to the format of the DCI.

As described in Proposal 1 and/or 2 and Embodiments 1 to 4, the user equipment may select a specific table from among a plurality of TDRA tables or recognize the parameters of the specific TDRA table, based on DCI, thereby know the allocated resource.

In this connection, even for the same TDRA table, parameter values recognized by the user equipment may vary based on the indicator included in the DCI.

For example, even for the same TDRA table, the user equipment may recognize that a specific column means a start symbol, a symbol duration length, a DMRS mapping type, and/or a K0/K2 offset, according to the indicator (or flag). When the value of the indicator changes, the user equipment may recognize that the same specific column of the same TDRA table means a symbol offset from the last symbol of the CORESET/PDCCH to the start symbol thereof, a symbol duration length, a DMRS mapping type, and/or a K0/K2 offset.

Resources on the time-domain may be allocated according to one of the plurality of TDRAs based on the DCI. One TDRA may be selected from among the plurality of TDRAs, based on the configuration of the DCI.

Thereafter, the processor 1221 or 1321 may receive data from the user equipment on the allocated resource via the RF unit (or module) 1223 or 1325.

Devices to which the present disclosure may be applied

Hereinafter, a device to which the present disclosure may be applied will be described.

FIG. 12 shows a wireless communication device according to an embodiment of the present disclosure.

Referring to FIG. 12, the wireless communication system may include a first device 1210 and a second device 1220.

The first device 1210 may be a base station, a network node, a transmission user equipment, a reception user equipment, a wireless device, a wireless communication device, vehicles, vehicles with autonomous driving functions, connected cars, drones (Unmanned Aerial Vehicles, UAVs), AI (Artificial Intelligence) modules, robots, AR (Augmented Reality) devices, VR (Virtual Reality) devices, MR (Mixed Reality) device, hologram device, a public safety device, an MTC device, an IoT device, a medical device, a fintech device (or a financial device), a security device, a climate/environment device, a device related to 5G service, or a device related to the 4th industrial revolution field.

The second device 1220 may be a base station, a network node, a transmission user equipment, a reception user equipment, a wireless device, a wireless communication device, a vehicle, a vehicle equipped with an autonomous driving function, a connected car, and a drone (Unmanned Aerial Vehicle, UAV), AI (Artificial Intelligence) module, robot, AR (Augmented Reality) device, VR (Virtual Reality) device, MR (Mixed Reality) device, hologram device, a public safety device, an MTC device, an IoT device, a medical device, a fintech device (or a financial device), a security device, a climate/environment device, a device related to 5G service, or a device related to the 4th industrial revolution field.

For example, the user equipment may include mobile phones, smart phones, laptop computers, user equipments for digital broadcasting, personal digital assistants (PDAs), PMP (portable multimedia player), navigation, slate PC, tablet PC, ultrabook, a wearable device (for example, a watch-type user equipment (smartwatch), a glass-type user equipment (smart glass), a head mounted display (HMD)), and the like. For example, the HMD may be a display device worn on the head. For example, HMD may be used to implement VR, AR or MR.

For example, a drone may be a vehicle free of a human being and flying based on a radio control signal. For example, the VR device may include a device that implements an object or a background of a virtual world. For example, the AR device may include a device that connects an object or background of a virtual world to an object or background of the real world and implements the combination. For example, the MR device may include a device that combines an object or a background of a virtual world with an object or a background of the real world and implements the combination. For example, the hologram device may include a device that records and reproduces 3D information using an interference phenomenon of light generated when two laser lights meet, referred to as holography, thereby to implements a 360 degrees 3D image. For example, the public safety device may include an image relay device or an image device wearable on a user's human body. For example, the MTC device and the IoT device may be devices that do not require direct human intervention or manipulation. For example, the MTC device and the IoT device may include a smart meter, a bending machine, a temperature meter, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, the medical device may be a device used for the purpose of examining, replacing or modifying a structure or function. For example, the medical device may be a device used for the purpose of controlling pregnancy. For example, the medical device may include a device for treatment, a device for surgery, a device for (in vitro) diagnosis, a device for hearing aid or a procedure. For example, a security device may be a device installed to prevent risks that might arise, and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts the climate/environment.

The first device 1210 may include at least one or more processors, such as the processor 1211, at least one or more memories, such as a memory 1212, and at least one or more transceivers, such as a transceiver 1213. The processor 1211 may perform the above-described functions, procedures, and/or methods. The processor 1211 may perform one or more protocols. For example, the processor 1211 may perform one or more layers of an air interface protocol. The memory 1212 may be connected to the processor 1211. Various types of information and/or commands may be stored therein. The transceiver 1213 may be connected to the processor 1211, and may be controlled to transmit and receive radio signals.

The second device 1220 may include at least one processor, such as the processor 1221, at least one memory device, such as a memory 1222, and at least one transceiver, such as a transceiver 1223. The processor 1221 may perform the above-described functions, procedures, and/or methods. The processor 1221 may implement one or more protocols. For example, the processor 1221 may implement one or more layers of an air interface protocol. The memory 1222 may be connected to the processor 1221. Various types of information and/or commands may be stored therein. The transceiver 1223 may be connected to the processor 1221, and may be controlled to transmit and receive radio signals.

The memory 1212 and/or the memory 1222 may be present inside or outside the processor 1211 and/or the processor 1221, respectively, and may be connected thereto. The memory 1212 and/or the memory 1222 may be connected to other processors using a variety of connection technologies, such as a wired or wireless connection.

The first device 1210 and/or the second device 1220 may have one or more antennas. For example, an antenna 1214 and/or an antenna 1224 may be configured to transmit and receive wireless signals.

FIG. 13 is another example of a block diagram of a wireless communication device to which the methods proposed according to the present disclosure may be applied.

Referring to FIG. 13, the wireless communication system includes a base station 1310 and a plurality of user equipments 1320 located in a base station coverage. The base station may be expressed as a transmitting device, and the user equipment may be expressed as a receiving device, or vice versa. The base station and the user equipment may respectively include processors 1311 and 1321, memories 1314 and 1324, one or more Tx/Rx radio frequency modules 1315 and 1325, Tx processors 1312 and 1322, Rx Processors 1313 and 1323, and antennas 1316 and 1326. The processor implements the above described functions, processes and/or methods. More specifically, in DL (communication from base station to user equipment), higher layer packets from the core network are provided to the processor 1311. The processor implements the functions of the L2 layer. In the DL, the processor provides multiplexing between logical channels and transmission channels, and radio resource allocation to the user equipment 1320, and is responsible for signaling to the user equipment. The transmit (TX) processor 1312 implements various signal processing functions for the L1 layer (that is, the physical layer). The signal processing function facilitates forward error correction (FEC) in the user equipment, and includes coding and interleaving.

The encoded and modulated symbols are divided into parallel streams. Each stream is mapped to an OFDM subcarrier and in turn is multiplexed with a reference signal (RS) in the time and/or frequency domain, and then the streams are combined together using IFFT (Inverse Fast Fourier Transform) to create a physical channel carrying a time-domain OFDMA symbol stream. The OFDM stream is spatially precoded to produce multiple spatial streams. The spatial streams may be provided to different antennas 1316 via a separate Tx/Rx module (or transceiver 1315). Each Tx/Rx module may modulate an RF carrier into each spatial stream for transmission. In the user equipment, each Tx/Rx module (or transceiver 1325) receives a signal via each antenna 1326 of each Tx/Rx module. Each Tx/Rx module reconstructs information modulated into an RF carrier and provides the information to the reception (RX) processor 1323. The RX processor implements a variety of layer 1 signal processing functions. The RX processor may perform spatial processing on the information to reconstruct an arbitrary spatial stream destined for the user equipment. When multiple spatial streams are directed to the user equipment, they may be combined into a single OFDMA symbol stream by multiple RX processors. The RX processor converts the OFDMA symbol stream from the time-domain to the frequency domain using Fast Fourier Transform (FFT). The frequency domain signal includes a separate OFDMA symbol stream for each subcarrier of the OFDM signal. The symbols and reference signal on each subcarrier are reconstructed and demodulated by determining the most probable signal constellation points transmitted by the base station. These soft decisions may be based on channel estimate values. Soft decisions are decoded and deinterleaved to restore the data and control signals originally transmitted by the base station on the physical channel. Corresponding data and control signals are provided to the processor 1321.

The UL (communication from user equipment to base station) is processed in the base station 1310 in a manner similar to that as described in connection with the receiver function in the user equipment 1320. Each Tx/Rx module 1325 receives a signal via a respective antenna 1326. Each Tx/Rx module provides an RF carrier and information to the RX processor 1323. The processor 1321 may be associated with a memory 1324 that stores program codes and data therein. The memory may be referred to as a computer-readable medium.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and can implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure can be implemented by various means, for example, hardware, firmware, software, or combinations thereof. When embodiments are implemented by hardware, one embodiment of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure.

Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

The present disclosure has been described mainly based on the example in which the disclosure is applied to the 3GPP LTE/LTE-A/NR system. However, the disclosure may be applied to various wireless communication systems other than the 3GPP LTE/LTE-A/NR system.

The invention claimed is:

1. A method for allocating a resource for a user equipment (UE),
via downlink control information (DCI) in a wireless communication system, the method comprising:
receiving, from a base station, the DCI for allocation of a resource for a physical downlink shared channel (PDSCH) in time-domain,
wherein the DCI includes a field for determining an entry among entries included a time-domain resource allocation (TDRA) table,
wherein a value of the field is related to an index value of the entry determined based on the field,
wherein a location of a first symbol of the resource for the PDSCH in the time-domain is relative to (i) a first symbol of a physical downlink control channel (PDCCH) related to the PDSCH, based on that the value of the field is included in a specific value range, and
wherein the location of the first symbol of the resource for the PDSCH in the time-domain is relative to (ii) a first symbol in a slot related to the PDSCH, based on that the value of the field is included in a range other than the specific value range.

2. The method of claim 1, wherein the first symbol of the PDCCH is a symbol from which a resource for the PDCCH in the time-domain starts.

3. The method of claim 2, wherein each of the entries included in the TDRA table is related to at least one of (i) start symbol information related to the symbol from which the resource for the PDSCH in the time-domain starts, (ii) duration information related to a symbol duration of the resource for the PDSCH in the time-domain, or (iii) mapping type information related to a type in which a demodulation reference signal (DMRS) is mapped on a resource.

4. The method of claim 1,
wherein the field included in the DCI indicates one of (i) the entries included in the TDRA table or (ii) entries included in another TDRA table configured differently from the TDRA table, and
wherein the resource for the PDSCH in the time-domain is allocated based on one TDRA table which is determined among (i) the TDRA table and (ii) the another TDRA table, based on whether the value of the field is included in a specific value range.

5. The method of claim 4, wherein the resource for the PDSCH in the time-domain is allocated based on the another TDRA table, based on that the value of the field is included in the specific value range, and
wherein the resource in the time-domain is allocated based on the TDRA table, based on that the value of the field is included in a range other than the specific value range.

6. The method of claim 5, wherein entries included in the another TDRA table are related to information different from information related to entries included in the TDRA table.

7. The method of claim 6, wherein each of the entries included in the another TDRA table is related to at least one of (i) symbol offset information related to a time offset value from a last symbol of the PDCCH, (ii) duration information related to a symbol duration of the resource in the time-domain, or (iii) mapping type information related to a type in which a DMRS is mapped on a resource.

8. The method of claim 1, wherein the resource in the time-domain is allocated further based on (i) a Radio Network Temporary Identifier (RNTI) for scheduling the resource in the time-domain or (ii) a Modulation Coding Scheme (MCS) for scheduling the resource in the time-domain.

9. A user equipment (UE) configured to be allocated a resource via downlink control information (DCI) in a wireless communication system, the UE comprising:
    a radio frequency (RF) module configured to transmit and receive a radio signal; and
    a processor functionally connected to the RF module,
    wherein the processor is configured to control the RF module to:
        receive, from a base station, the DCI for allocation of a resource for a physical downlink shared channel (PDSCH) in time-domain,
    wherein the DCI includes a field for determining an entry among entries included in a time-domain resource allocation (TDRA) table,
    wherein a value of the field is related to an index value of the entry determined based on the field,
    wherein a location of a first symbol of the resource for the PDSCH in the time-domain is relative to (i) a first symbol of a physical downlink control channel (PDCCH) related to the PDSCH, based on that the value of the field is included in a specific value range, and
    wherein the location of the first symbol of the resource for the PDSCH in the time-domain is relative to (ii) a first symbol in a slot related to the PDSCH, based on that the value of the field is included in a range other than the specific value range.

10. The UE of claim 9, wherein the first symbol of the PDCCH is a symbol from which a resource for the PDCCH in the time-domain starts.

11. The UE of claim 10, wherein each of the entries included in the TDRA table is related to at least one of (i) start symbol information related to the symbol from which the resource for the PDSCH in the time-domain starts, (ii) duration information related to a symbol duration of the resource for the PDSCH in the time-domain, or (iii) mapping type information related to a type in which a demodulation reference signal (DMRS) is mapped on a resource.

12. The UE of claim 9,
    wherein the field included in the DCI indicates one of (i) the entries included in the TDRA table or (ii) entries included in another TDRA table configured differently from the TDRA table, and
    wherein the resource for the PDSCH in the time-domain is allocated based on one TDRA table which is determined among (i) the TDRA table and (ii) the another TDRA table, based on whether the value of the field is included in a specific value range.

13. The UE of claim 12, wherein the resource for the PDSCH in the time-domain is allocated based on the another TDRA table, based on that the value of the field is included in the specific value range, and
    wherein the resource in the time-domain is allocated based on the TDRA table, based on that the value of the field is included in a range other than the specific value range.

14. The UE of claim 13, wherein entries included in the another TDRA table are related to information different from information related to entries included in the TDRA table.

15. The UE of claim 14, wherein each of the entries included in the another TDRA table is related to at least one of (i) symbol offset information related to a time offset value from a last symbol of the PDCCH, (ii) duration information related to a symbol duration of the resource in the time-domain, or (iii) mapping type information related to a type in which a DMRS is mapped on a resource.

16. The UE of claim 9, wherein the resource in the time-domain is allocated further based on (i) a Radio Network Temporary Identifier (RNTI) for scheduling the resource in the time-domain or (ii) a Modulation Coding Scheme (MCS) for scheduling the resource in the time-domain.

* * * * *